United States Patent [19]

Poncelet

[11] Patent Number: 5,165,160
[45] Date of Patent: Nov. 24, 1992

[54] APPARATUS AND METHOD FOR AXIALLY ALIGNING STRAIGHT OR CURVED CONDUITS

[76] Inventor: George V. Poncelet, 748 - 10th Street, Kamloops, British Columbia, Canada, V2B 2Z7

[21] Appl. No.: 733,634

[22] Filed: Jul. 22, 1991

[51] Int. Cl.$^5$ ............... B23K 37/04; B23K 101/10
[52] U.S. Cl. ............... 29/464; 228/49.3; 269/43
[58] Field of Search ............... 228/44.5, 49.3, 212; 269/43; 29/464

[56] References Cited

U.S. PATENT DOCUMENTS

| | | | |
|---|---|---|---|
| 2,329,613 | 9/1943 | Hokanson | 29/89 |
| 2,846,968 | 8/1958 | Tipton | 113/102 |
| 3,400,872 | 9/1968 | Rogers | 228/44.5 |
| 3,422,519 | 1/1969 | Fehlman | 29/200 |
| 3,467,295 | 9/1969 | Watson | 229/49 |
| 3,920,232 | 11/1975 | Clark | 269/25 |
| 3,925,854 | 12/1975 | McFadden | 24/81 |
| 3,944,202 | 3/1976 | Dearman | 269/130 |
| 3,952,936 | 4/1976 | Dearman | 228/49.3 |
| 4,586,647 | 5/1986 | Dearman | 228/49.3 |

FOREIGN PATENT DOCUMENTS

| | | | |
|---|---|---|---|
| 457910 | 7/1948 | Canada . | |
| 833997 | 2/1970 | Canada | 269/46 |
| 878238 | 8/1971 | Canada | 78/96 |
| 923155 | 3/1973 | Canada | 269/29 |
| 1019600 | 10/1977 | Canada | 78/64 |
| 1227956 | 10/1987 | Canada | 78/64 |
| 804322 | 2/1981 | U.S.S.R. | 228/49.3 |
| 1232042 | 5/1971 | United Kingdom . | |

Primary Examiner—Kenneth J. Ramsey
Attorney, Agent, or Firm—Bull, Housser & Tupper

[57] ABSTRACT

An apparatus and method for aligning conduits including pipes, pipe fittings and the like prior to joining, the apparatus including a first ring assembly for removably encircling an end portion of a first conduit to be joined and a second ring assembly for removably encircling an end portion of a second conduit to be joined to the end portion of the first conduit. A connecting device is provided for connecting the first and second ring assemblies together axially spaced apart so that the ring assemblies are spaced apart sufficiently to permit joining of the end portions of the conduits between the first and second ring assemblies. The apparatus is also provided with aligning provisions for axially aligning the end portions of the first and second conduits, the aligning provisions being disposed between the ring members and including a plurality of adjustable contact surfaces for contacting respective end portions of the first and second conduits. The contact surfaces are moveable relative to each other to move the first and second conduits into an axially aligned position.

18 Claims, 7 Drawing Sheets

APPARATUS AND METHOD FOR AXIALLY ALIGNING STRAIGHT OR CURVED CONDUITS

BACKGROUND OF THE INVENTION

The invention relates to an apparatus and method for axially aligning conduits to permit "tack" welding of the conduits prior to welding. In particular, the apparatus and method are particularly adapted to axially align conduits, irrespective of curvature, wall thicknesses and respective diameters of the conduits to be welded.

In welding two conduits together in end-to-end relation it is preferable to align the conduits axially to ensure a good quality, even weld. Such axial alignment is relatively easily achieved where the conduits to be joined are of the same diameter, have the same wall thickness and are straight at the end portions to be joined. However, such axial alignment is difficult to achieve when the conduits are curved as in the case of elbows, or where the wall thickness or outside diameter of the conduits are different as in the case of conduits supplied by different countries.

Previously, the alignment of curved conduits or conduits with differing wall thicknesses or outside diameters was performed by welding lugs onto respective end portions of the conduits to be joined and providing jacking bolts which could be selectively tightened to align the conduits. The joint could then be "tacked" and the jacking bolts removed and the lugs cut off to permit full welding of the entire joint. This however requires the complicated step of welding the lugs onto the conduits and then cutting the lugs off and grinding smooth the outside surfaces of the conduits. This can be very time consuming and in some cases is difficult to do due to space limitations in the proximity of the conduits. In addition, some types of steel such as Chrome steel cannot have lugs welded thereto.

Other inventors have sought to solve the problem of aligning conduits, however, they have addressed the problem of aligning straight conduits or conduits having a mitred joint. For instance U.S. Pat. No. 3,422,519 to Fehlman discloses a lineup clamp for pipe. However the surfaces for contacting the end portions of the pipe are spaced relatively far apart which might render the device difficult to use on curved portions of pipe.

U.S. Pat. No. 3,920,232 to Clark discloses an apparatus for aligning pipe ends which uses a hydraulic ram acting on a pipe in a circular cradle to align two pipes to be joined together. The apparatus thus appears to be intended for use with pipes of a specific diameter and of the same outside diameter and wall thickness.

U.S. Pat. No. 3,467,295 to Watson discloses a clamping means for pipes and fittings which has a first pipe contact member and an extending arm having a screw member acting as a second pipe contacting member. Considerable leverage is applied to the extending arm to provide sufficient force on the screw member to align the pipes. The extending arm might limit the use of the apparatus only to applications where there is sufficient distance for the arm to extend between the two conduits to be joined.

U.S. Pat. No. 3,944,202 to Dearman discloses a clamping device for use in making mitred joints in pipe sections and U.S. Pat. No. 3,925,854 to McFadden discloses an alignment clamp. Both of these devices are similar to the Watson patent in that they both employ an extending arm and require sufficient distance for the arm to extend between the two conduits to be joined.

From the above prior art it can be seen that there is a need for a device which permits alignment of conduits having differing outside diameters and differing wall thicknesses and/or a curved portion adjacent the portion or part of the end portion to be joined.

SUMMARY OF THE INVENTION

In accordance with the present invention there is provided an apparatus for aligning conduits including pipes, pipe fittings and the like prior to joining including first ring means for removably encircling an end portion of a first conduit to be joined and second ring means for removably encircling an end portion of a second conduit to be joined to the end portion of the first conduit. Connecting means are provided for connecting the first and second ring means together in axially spaced apart relation so that the ring means are spaced apart sufficiently to permit joining of the end portions of the conduits between the first and second ring assemblies. The apparatus is also provided with aligning means for axially aligning the end portions of the first and second conduits, the aligning means being disposed between the ring members and including a plurality of adjustable contact surfaces for contacting respective end portions of the first and second conduits. The contact surfaces are moveable relative to each other to move the first and second conduits into an axially aligned position.

Preferably, the apparatus includes respective first and second arcuate members forming the ring means, the first and second arcuate members being hingedly connected together to permit the ring means to be removed from respective conduits after welding.

Also preferably, the apparatus includes locking means for locking the first and second arcuate members in a circular form.

Also preferably, the connecting means includes a plurality of bridge members extending between the first and second ring means, the bridge members being spaced apart angularly around the ring means.

Also preferably, the aligning means includes first and second screws on each bridge member, the screws being axially spaced apart, the first screw being adjacent the first ring means and the second screw being adjacent the second ring means, the first and second screws having first and second contact surfaces respectively, the first and second contact surfaces cooperating with respective bridge members to extend generally radially inwardly of the ring means to abut the first and second contact surfaces against the end portions of the first and second conduits respectively.

In accordance with another aspect of the invention there is provided a method of aligning conduits including pipes, pipe fittings, and the like prior to joining, the method comprising the steps of:

a) removably encircling an end portion of a first conduit to be joined with a first ring means;

b) removably encircling an end portion of a second conduit to be joined to the end portion of the first conduit with a second ring means;

c) connecting the first and second ring means together axially and spaced apart sufficiently to permit joining of the end portions of the conduits between the first and second ring means;

d) moving a plurality of adjustable contact surfaces disposed between the ring members, relative to each other, the contact surfaces contacting the first and second conduits to move the first and second conduits into an axially aligned position.

Preferably, the method includes the step of extending first and second screws radially inward of the ring means such that first and second contact surfaces on the first and second screws respectively abut the end portions of the first and second conduits respectively.

DISCLOSURE

Figure 1:
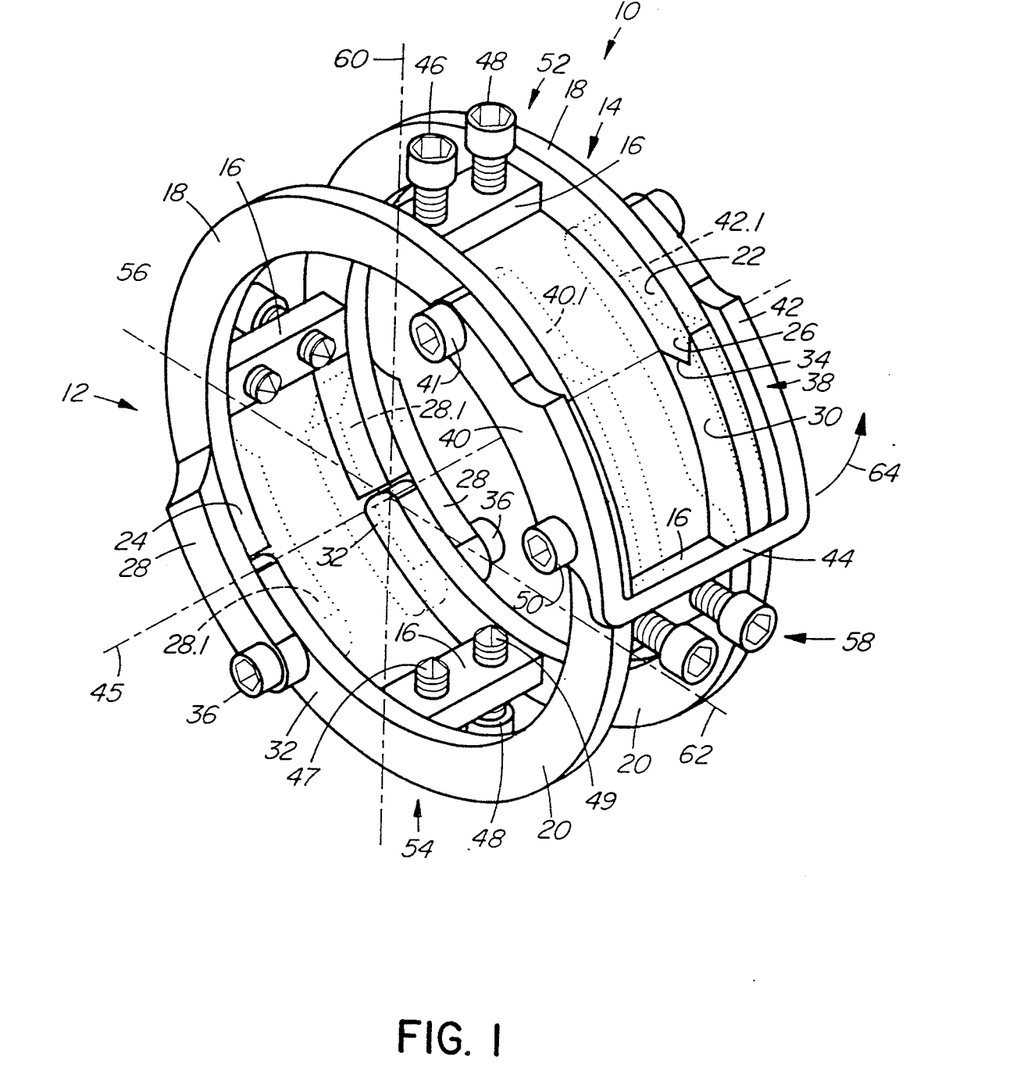
FIG. 1 is a perspective view of an apparatus according to a first embodiment of the invention.

Referring to FIG. 1, an apparatus for aligning conduits such as pipes, pipe fittings and the like prior to joining is shown generally at 10. The apparatus comprises first and second ring assemblies 12 and 14 connected together by a plurality of bridge members 16.

The first and second ring assemblies 12 and 14 each include respective first and second arcuate members 18 and 20, formed from CHT-100 High Tensile Steel. Such steel is preferred over mild steel due to its hardness, strength and ability to provide a degree of radial resilience in the arcuate members. Generally, the first and second ring assemblies are similar and therefore reference will be made to the ring assemblies in general, it being understood that reference to one ring assembly may also refer to similar structure in the other.

The first ring assembly 12 includes a first arcuate member 18 having a first end portion 22 and a second end portion 24. The first end portion has a pointed projection 26, seen best on the second ring assembly 14, and the second end portion has a connecting member 28, seen best on the first ring assembly 12, which protrudes in a manner following the arc of the first arcuate member 18.

The second arcuate member 20 has a first end portion 30 and a second end portion 32, seen best on the second ring assembly 14. The first end portion 30 has a receptacle 34 for receiving the pointed projection 26 therein. The pointed projection 26 and receptacle 34 thus act as complementary engageable end portions for registering the end portions in alignment to maintain respective ring assemblies in a generally circular form.

The second end portion 32 is pivotally connected to the connecting member 28 by a bolt 36. The first and second arcuate members 18 and 20 are connected together by the connecting member 28 and the bolt 36 such that they are coplanar.

Figure 2:
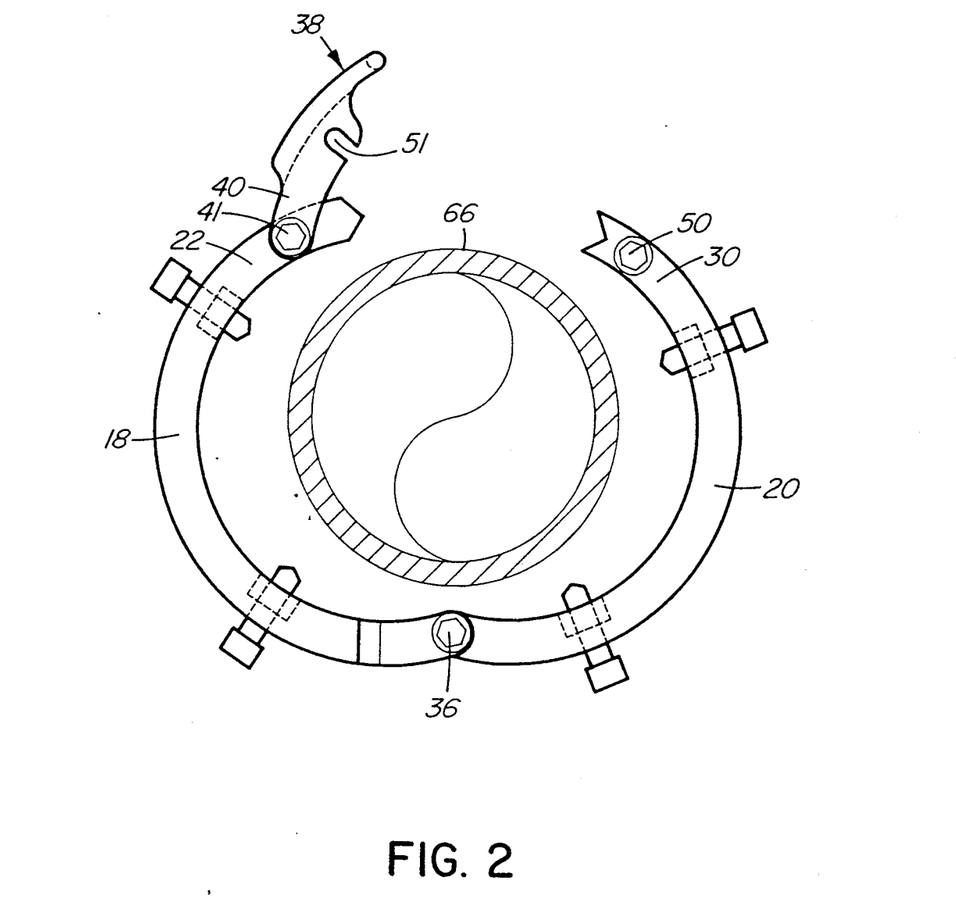
FIG. 2 is a front view of the apparatus of FIG. 1 shown in an open position, receiving conduits to be joined together therein.

It will be appreciated that the bolt is of the type having a shank with an unthreaded portion immediately adjacent the head and a threaded portion immediately adjacent the unthreaded portion. The threaded portion of the bolt is received in a complementary threaded opening (not shown) in the second end portion 32 such that travel of the bolt into the second end portion is limited, to permit the unthreaded portion of the shank to act as a pivot pin about which the connecting member 28 can pivot as shown in FIG. 2. Furthermore it is preferred that the threaded portion of the shank not project into the region between the first and second ring assemblies to permit easy access therebetween with joining equipment such as a welding rod. The threaded portion of the bolt is tack welded to the second end portion 32 such that the bolt is rigidly connected to the second end portion to prevent inadvertent loss of the bolt.

Referring to FIGS. 1 and 2, the apparatus further includes a locking member shown generally at 38, for locking the first and second arcuate members together, in circular arrangement. Referring to FIG. 1, the locking member is generally U-shaped and has first and second side portions 40 and 42 which are connected together by a cross member 44. Generally, the first and second side portions are similar and therefore only the first side portion will be described, it being understood that the second side portion is similar to the first side portion.

Referring to FIG. 2, the first side portion 40 is generally arcuate in shape and is pivotally connected to the first end portion 22 by a bolt 41 similar to the bolt 36 described above. Bolt 41 is welded to the first end portion 22. The side portion 40 is provided with a recess 51 which projects transversely of the side portion 40 and is operable to receive an unthreaded portion (not shown) of a bolt 50 mounted on the first end portion 30 of the second arcuate member 20. Bolt 50 is welded to the first end portion 30.

In FIG. 2, the locking member is shown in an unlocking position wherein the first and second arcuate members are operable to pivot relative to each other. In FIG. 1 the locking member is shown in a locking position wherein the bolt 50 is received within the recess 51 and the first and second arcuate members 18 and 20 are prevented from relative pivotal movement.

Figure 3:
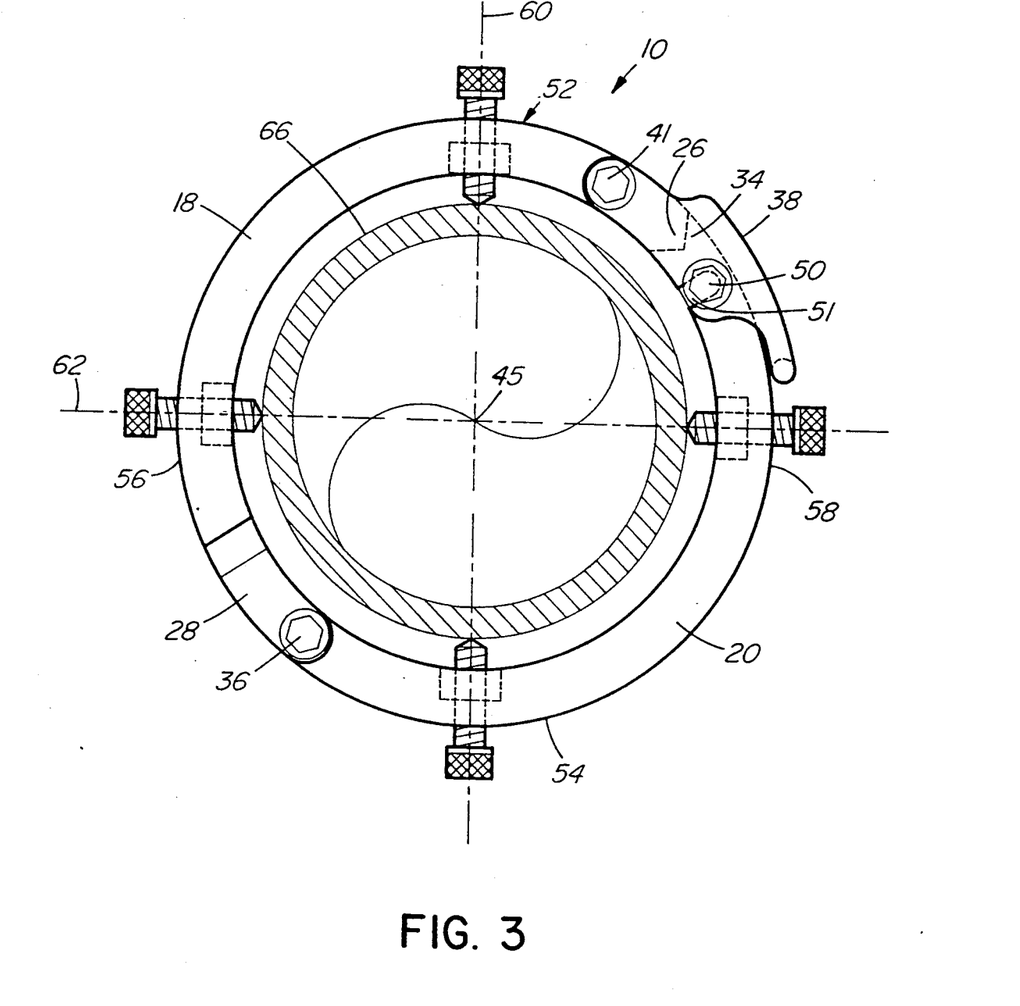
FIG. 3 is a front view of the apparatus of FIG. 1 shown in a locked position about the conduits to be joined together.
Figure 4:
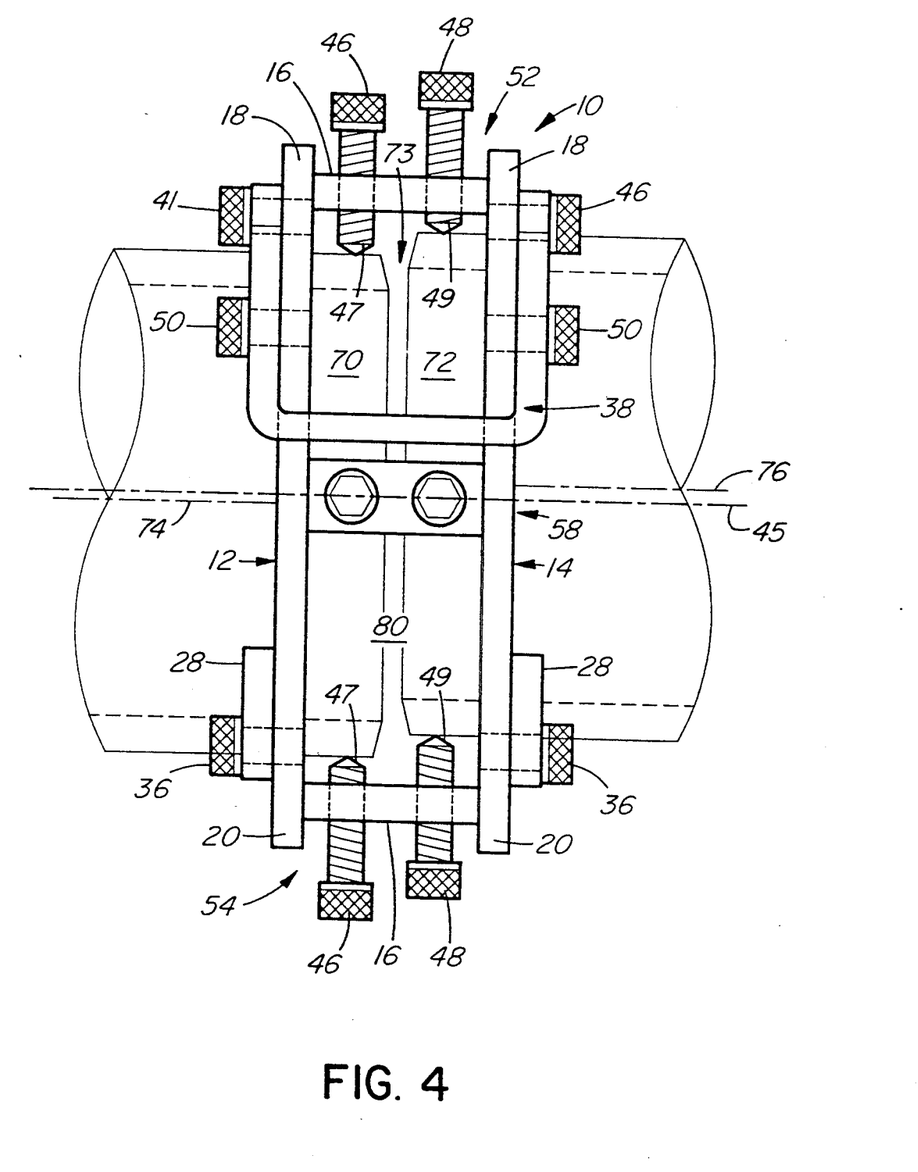
FIG. 4 is a side view of the apparatus of FIG. 1 shown mounted on two straight conduits to be joined together.

The first and second side portions 40 and 42 of the locking member 38 are held in spaced apart relation by the cross member 44 such that the respective first end portions 22 and 30 of the first and second arcuate members respectively of each ring assembly are disposed between the first and second side portions 40 and 42 and are held against axial spreading by the side portions. Thus the first end portions 22 and 30 are held between the side portions 40 and 42 of the locking member 38 while the cross member 44 extends across and over the first and second ring assemblies 12 and 14. This provides a relatively rigid connection of the first end portions 22 and 30 of the ring assemblies. The locking member 38 thus acts as locking means for locking the first and second arcuate members 18 and 20 in a circular form. As seen in FIGS. 1, 3, and 4, the cross member 44 is positioned adjacent to one of the bridge members 16 connecting the rings together in order not to substantially impeded welding access to the areas between the spaced connecting means.

Referring to FIG. 1, the bridge members 16 are connected between respective first and respective second arcuate members 18 and 20 and serve to connect together the first and second ring assemblies 12 and 14 in parallel spaced apart relation. The first and second circular assemblies 12 and 14 thus lie in respective spaced apart planes and are centred on a common axis 45.

In the embodiment shown, there are four bridge members equidistantly spaced about the circumference of the ring assemblies. In particular, in this embodiment, the bridge members are spaced apart by 90 degrees. The apparatus thus includes a plurality of bridge members extending between the first and second ring assemblies, the bridge members being spaced apart angularly around the ring assemblies. The bridge members 16 are similar to each other and therefore only one will be described, it being understood that the remaining bridge members are similar.

Referring to FIG. 3, in the embodiment shown, the apparatus includes bridge members at a top portion 52, a bottom portion 54, a first side portion 56 and a second side portion 58 thereof. Each of the bridge members is situated between the ring assemblies as close as possible to the common axis 45 to reduce any tendency of the ring members to deform when the apparatus is in use.

Referring to FIG. 1, bridge member 16 at the bottom portion 54 extends between respective second arcuate members 20 and has first and second screw members 46 and 48, having respective first and second contact surfaces 47 and 49. The screw members 46 and 48 are threaded in the bridge member in parallel spaced apart relation, the screw members being spaced apart in a direction parallel to the common axis 45 of the first and second circular assemblies 12 and 14, the first screw member being adjacent the first ring assembly and the second screw being adjacent the second ring assembly. The first and second screw members 46 and 48 thus extend radially of the ring assemblies and are operable to be rotated to move the first and second contact surfaces 47 and 49 respectively radially towards or away from the common axis 45.

The bridge members at the top and bottom portions 52 and 54 permit their first and second screw members to extend radially along a first axis 60 and the bridge members at the first and second side portions 56 and 58 permit their first and second screw members to extend radially along a second axis 62.

OPERATION

Referring to FIG. 1, the apparatus 10 is rendered ready for use by lifting the locking member 38 in a direction shown by arrow 64 such that the locking member 38 is clear of the second arcuate member 20. Referring to FIG. 2, the locking member 38 is shown out of engagement with the bolt 50 and clear of the second arcuate member 20.

Still referring to FIG. 2, the first and second arcuate members 18 and 20 are then hinged outwards relative to each other into the position shown in FIG. 2, wherein respective end portions of first and second conduits to be joined can be inserted between the first and second arcuate members 18 and 20. For illustrative purposes, the conduits are shown generally at 66 in FIG. 2.

Referring to FIG. 3, the first and second arcuate members 18 and 20 are then closed upon the conduits 66 until the projection 26 is received within the receptacle 34. The end portions of the first and second arcuate members 18 and 20 are thus registered in alignment to maintain respective ring means in a generally circular form. The locking member 38 is then rotated to engage the recess 51 with bolt 50. Bolt 50 and recess 51 cooperate to secure the locking member 38 in locking engagement wherein the first and second arcuate members 18 and 20 are held in the circular form. As the recess 51 extends transversely of the side portion 40, forces between the recess 51 and the bolt 51 tend to act perpendicular to the recess thereby maintaining the locking member 38 in engagement.

Referring to FIG. 4, the apparatus is installed on the end portions of two straight conduits to be joined such that the first ring assembly 12 removably encircles a first end portion 70 of a first conduit to be joined and the second ring assembly removably encircles a second end portion 72 of a second conduit to be joined to the end portion of the first conduit.

It will be appreciated that the first end portion 70 has a first longitudinal axis 74 and the second end portion has a second longitudinal axis 76 and that the first and second axes 74 and 76 are preferably aligned and coincident with common axis 45 before the conduits are joined together, to ensure a good quality joint.

Alignment of the first and second axes is effected by rotating the first and second screws 46 and 48 on each bridge member 16 such that the first and second contact surfaces 47 and 49 cooperate with respective bridge members to move relative thereto. The first and second screws extend generally radially inwardly of the ring assemblies to abut respective first and second contact surfaces 47 and 49 against the end portions 70 and 72 of the first and second conduits respectively near a join line 73 formed by the abutment of the first and second conduits axially together. The screws 46 and 48 may then be selectively rotated to move the first and second conduits into an axially aligned position. The screw members and contact surfaces act as aligning means for axially aligning the end portions of the first and second conduits, the aligning means being disposed between the ring assemblies.

With the end portions 70 and 72 in alignment, the task of joining the end portions together can be performed. If the conduits are to be joined by welding, the apparatus provides easy access to the joint to be welded, in areas bounded by the ring assemblies and the bridge members such as shown generally at 80 in FIG. 4. It will be appreciated that in the embodiment shown there are four such areas equally spaced and separated by the bridge members. This permits a welder to "tack" weld the joint in at least four locations around the joint, or alternatively a longer root bead weld can be made in this area. Furthermore as the evenly spaced bridge members place the contact surfaces of the screw members evenly around the end portions of the conduits, electrical grounding of the conduits is evenly distributed which acts to prevent "arc blow" due to welding.

After "tacking" the joint, the apparatus can then be removed from the conduits by unlocking the locking member 38 and hinging the apparatus open into the position shown in FIG. 2. The apparatus can then be removed from the conduits and welding of the entire joint can then be performed without hinderance of the apparatus.

It will be appreciated that the first and second ring means each include respective first and second arcuate members hingedly connected together to permit the ring means to be removed from respective conduits after welding and that the bridge members act as connecting means for connecting the first and second ring assemblies together in axially spaced apart relation so that the ring assemblies are spaced apart sufficiently to permit joining or "tacking" of the end portions of the conduits between the first and second ring assemblies.

ALTERNATIVE USES

Figure 5:
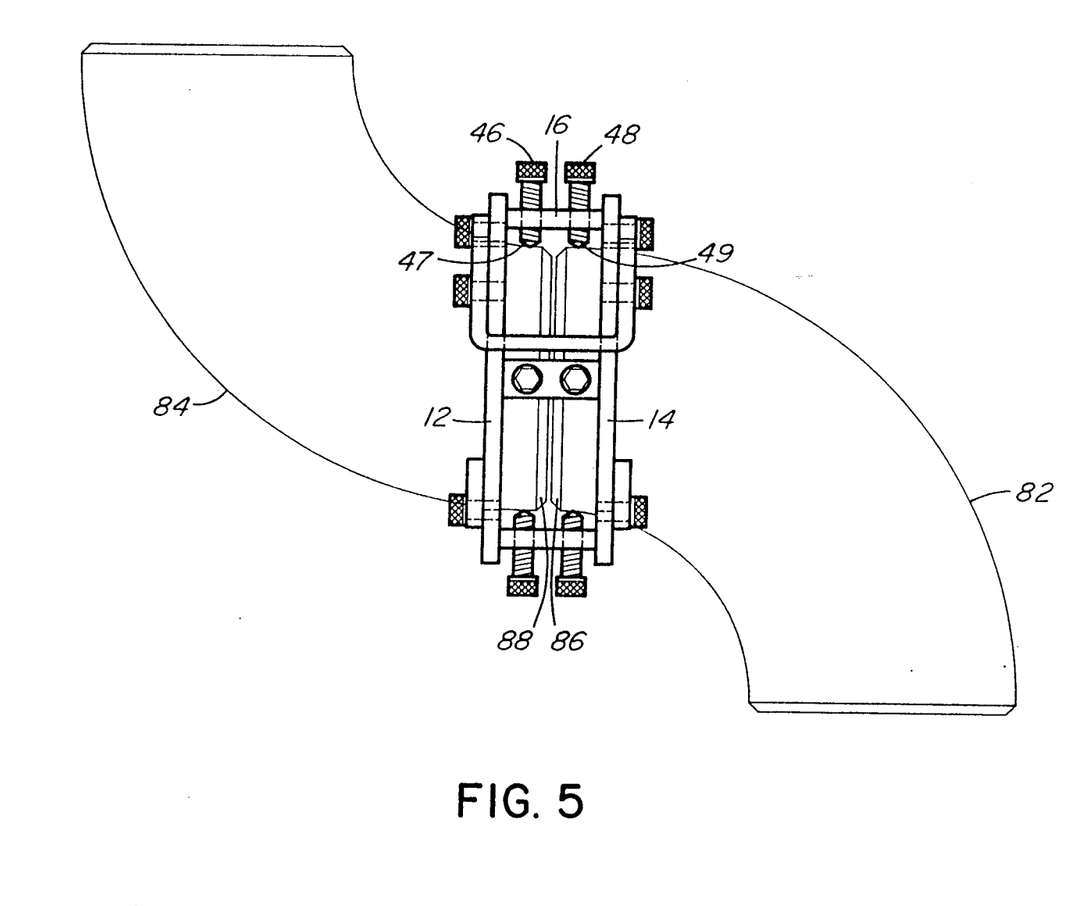
FIG. 5 is side view of the apparatus of FIG. 1 shown mounted on two curved conduits to be joined together.

Referring to FIG. 5, in one use of the apparatus, the apparatus is mounted on two oppositely curved conduits 82 and 84. As the first and second screws 46 and 48 are mounted on the bridge members 16 the first and second contact surfaces 47 and 49 are disposed in close proximity but spaced apart sufficiently to provide good contact on the respective end portions of the conduits to be joined. The first and second contact surfaces 47 and 49 contact the end portions of the conduits immediately adjacent any weld bevel on the conduits such as shown at 86 and 88 in FIG. 5. As the contact surfaces 47 and 49 are in close proximity to each other, curved conduits such as those shown in FIG. 5 can be aligned and "tack" welded together easily and without difficulty.

Figure 6:
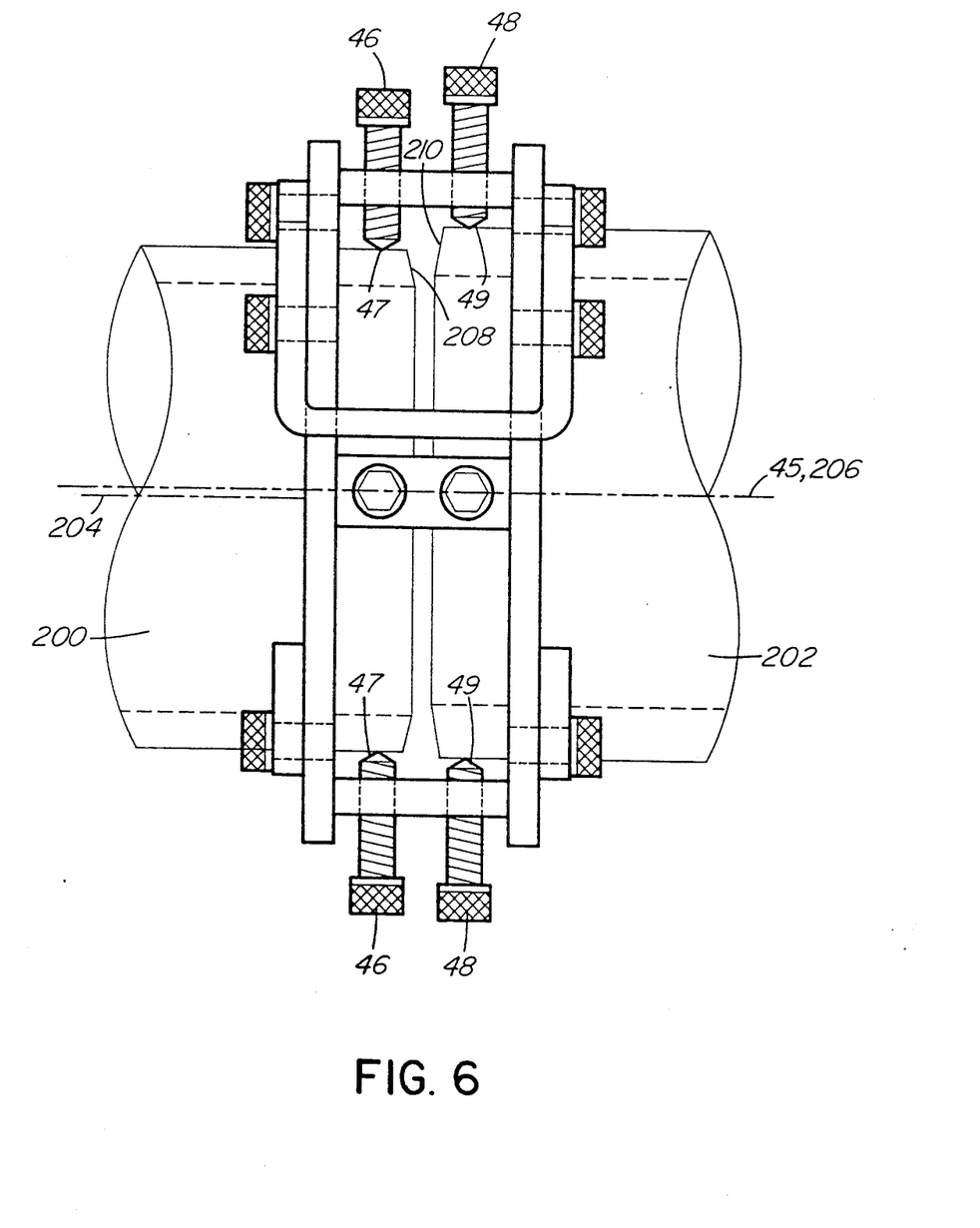
FIG. 6 is a side view of the apparatus of FIG. 1 shown mounted on two straight conduits having different wall thicknesses and outside diameters.

Referring to FIG. 6, in an alternative use of the apparatus, the apparatus is used to align and join together conduits 200 and 202 of slightly different outside diameter and different wall thicknesses. This has particular advantages where a particular job involves connecting together conduits supplied by a plurality of countries which supply conduits having differing wall thicknesses and outside diameter. The apparatus is mounted to such conduits in a manner similar to that described above. As the first and second screws 46 and 48 are mounted on the bridge members 16 the first and second contact surfaces 47 and 49 are disposed in close proximity but spaced apart axially sufficiently to provide good contact on the respective end portions of the conduits to be joined. Furthermore, the first and second screws 46 and 48 are rotated such that the first and second contact surfaces 47 and 49 are at different distances from the common axis 45, whereby the difference in outside diameter is accommodated and alignment respective conduit axes 204 and 206 is achieved by further rotation of the screws as required.

ALTERNATIVES

Referring to FIG. 1, in an alternative embodiment, particularly adapted for aligning large diameter pipes, there is a connecting member 28.1 (shown in broken outline) similar to connecting member 28, on an inside portion of each of the first arcuate members 18. The bolt 36 extends between the connecting members 28 and 28.1 and is welded to each member 28 and 28.1. The bolt extends through an opening (not shown) in the second arcuate member to provide the required pivotal connection of the first and second arcuate members. The use of connecting members 28 and 28.1 provides extra strength to the apparatus which is advantageous where large diameter and hence heavy pipes are to be joined.

In addition, the locking member is reinforced for use with large diameter pipes in that it is provided with inner side portions 40.1 and 42.1 parallel and spaced apart from side portion 40 and 42 respectively. The first end portion 22 of the first arcuate member 18 and the first end portion 30 of the second arcuate member 20 are received between the side portions 40 and 40.1 and 42 and 42.1 respectively. The bolt 41 extends between the side portions 40 and 40.1, through an opening (not shown), in the first arcuate member 18. The bolt is welded to the side portions 40 and 40.1 but is free to pivot within the opening in the first arcuate member to provide the necessary pivotal movement of the locking member 44 relative to the ring assemblies. Bolt 50 remains as described above when the inner side portions 40.1 and 42.1 are employed. The use of the inner side portions prevents buckling or twisting of the end portions 22 and 30 relative to each other and maintains the ring assemblies in a circular form when under loads imposed by tightening the screw members 46 and 48. The inner side portions 40.1 and 42.1 are particularly useful when the apparatus is used on large diameter pipes.

Figure 7:
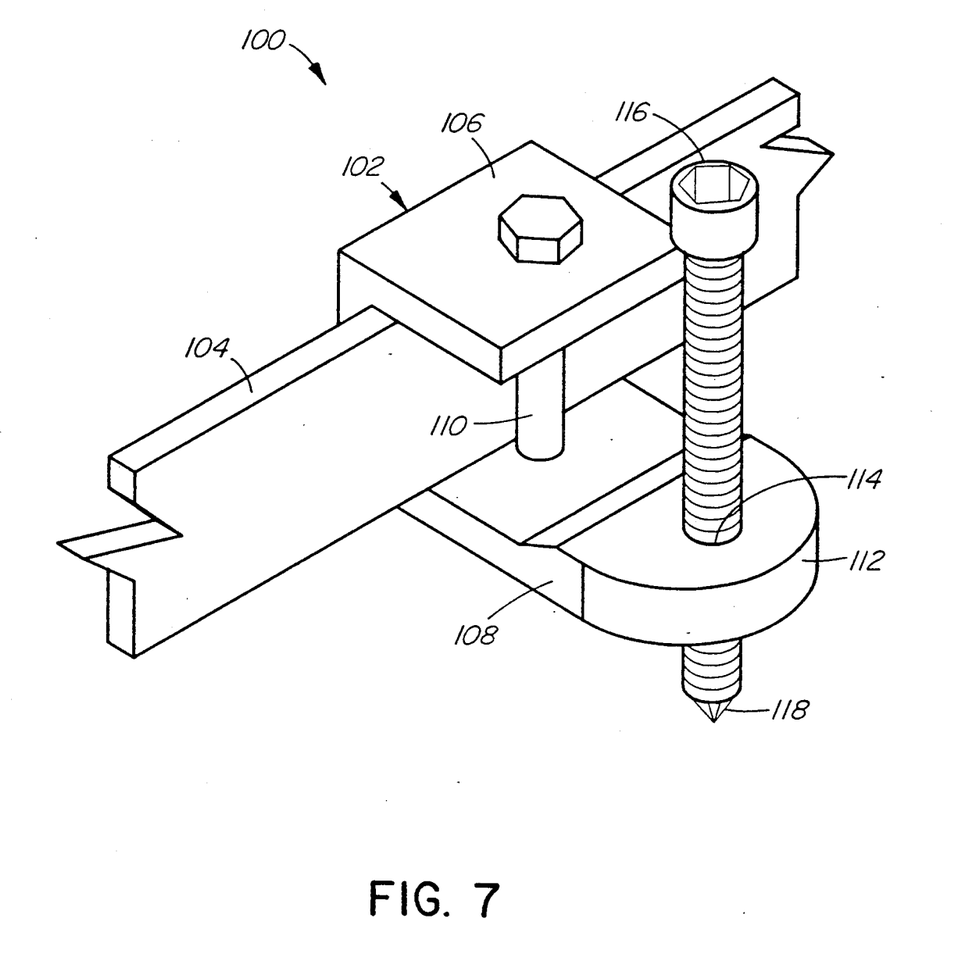
FIG. 7 is a perspective view of an alignment member for optional use with the apparatus of FIG. 1.

Referring to FIG. 7, an additional aligning member for the apparatus shown in FIGS. 1–5 is shown generally at 100. The aligning member includes a generally U-shaped member 102 which is fitted over a portion 104 of the first or second arcuate member of FIGS. 1–5. The U-shaped member 102 has first and second leg portions 106 and 108 respectively, the second leg portion 108 being longer than the first leg portion 106. A conventional bolt 110 extends between the first and second leg portions and acts to secure the U-shaped member 102 to the portion 104. It will be appreciated that the U-shaped member may be installed on the first or second arcuate member at any desired location and is therefore removably connectable to at least one of the ring assemblies.

The second leg portion 108 of the U-shaped member has a distal end portion 112 having a threaded opening 114 which extends radially relative to the common axis 45 shown in FIG. 1 when the U-shaped member is installed on an arcuate member. A bolt 116 having a third contact surface 118 is in threaded engagement with the threaded opening 114 and is operable to be rotated to move the third contact surface 118 relative to the U-shaped member and hence relative to the ring assembly to which the U-shaped member is attached. The third contact surface is thus operable to move radially inwards and outwards relative to the common axis 45 of FIG. 1 and therefore is operable to provide a further contact point to assist in aligning the conduits prior to "tacking". It will be appreciated that any number of additional alignment members may used in conjunction with the apparatus of FIGS. 1–5 to permit movement of the end portions of the conduits in any direction radial to the common axis 45.

The alignment members are particularly useful where the radius of the conduits to be joined and hence the radii of the ring assemblies is relatively large. In particular, the apparatus is useful in aligning large diameter, thin-walled stainless steel pipe as the alignment members can be used to provide enough force to deform the wall of the pipe at a particular location to permit easy alignment of the walls of the pipes to be joined.

It will also be appreciated that the additional alignment members may be installed on the ring assemblies such that the third contact surfaces 118 are located between the ring assemblies or such that the third contact surfaces are located outside of the ring assemblies, thus providing versatility in choosing additional contact points for applying additional alignment forces to align the conduits to be "tacked" or joined.

I claim:
1. An apparatus for aligning conduits including pipes, pipe fittings and the like prior to joining, the apparatus comprising:
   a) first and second ring means for removably encircling respective end portions of first and second conduits to be joined together, each of said first and second ring means including respective first and second arcuate members connected together by respective hinges, the first and second arcuate members having complementary shaped mating end portions for registering the end portions in alignment with each other to maintain the first and second ring means in a generally fixed form;

b) a plurality of circumferentially spaced apart rigid connecting means for connecting the first and second ring means so that the ring means are axially spaced apart sufficiently to permit joining of the end portions of the conduits in open spaces between the first and second ring means the connecting means being disposed entirely between the ring means so as not to obstruct areas outside the first and second ring means;

c) locking means for locking the first and second ring means in a fixed form, the locking means being located so as not to obstruct the open spaces between the connecting means; and d) aligning means on the connecting means, for axially aligning the end portions of the first and second conduits, the aligning means including a plurality of adjustable contact surfaces for contacting respective end portions of the first and second conduits only in the space between the first and second ring means, each contact surface being movable relative to each other to move the first and second conduits into an axially aligned position.

2. An apparatus as claimed in claim 1 wherein the connecting means includes a plurality of bridge members extending between the first and second ring means.

3. An apparatus as claimed in claim 2 wherein the aligning means includes first and second screws on each bridge member, the screws being axially spaced apart, the first screw being adjacent the first ring means and the second screw being adjacent the second ring means, the first and second screws having first and second contact surfaces respectively, the first and second contact surfaces cooperating with respective bridge members to extend generally radially inwardly of the ring means to abut the first and second contact surfaces against the end portions of the first and second conduits respectively near a join line formed by abutment of the first and second conduits axially together.

4. An apparatus as claimed in claim 1 further including a removably connectable aligning member removably connectable to at least one of the ring means.

5. An apparatus as claimed in claim 1 further including a plurality of removably connectable aligning members removably connectable to at least one of the ring means.

6. An apparatus as claimed in claim 1 wherein the first and second arcuate members of each ring means have respective first and second end portions, the first end portions of the first arcuate members each having a respective pointed projection thereon and the first end portions of the second arcuate members having respective receptacles thereon for receiving respective pointed projections of corresponding first end portion.

7. An apparatus as claimed in claim 6 wherein said pointed projections are V-shaped and wherein said receptacles are V shaped.

8. An apparatus as claimed in claim 1 wherein said locking means includes a U-shaped locking member having first and second side portions connected together by a cross member, the first and second side portions being separately pivotally connected to respective first end portions of the respective first arcuate members such that the cross member is immediately adjacent one of said connecting means so that neither the pivotal connection nor the cross member obstruct the weld area.

9. An apparatus as claimed in claim 8 wherein the complementary mating end portions are received between the first and second side portions of the locking means such that spreading of the complementary mating end portions in an outward axial direction is prevented.

10. An apparatus as claimed in claim 8 wherein the locking means includes first and second inner side portions disposed parallel to and spaced apart from corresponding first and second side portions such that respective complementary mating end portions are received between respective side and inner side portions, respective side and inner side portions acting to prevent inward and outward axial spreading of respective complementary mating end portions.

11. An apparatus for aligning conduits including pipes, pipe fittings and the like prior to joining, the apparatus comprising:

a) first and second ring means for removably encircling respective end portions of first and second conduits to be joined together, each of said first and second ring means including respective first and second arcuate members hingedly connected together, the first and second arcuate members having complementary shaped mating end portions for registering the end portions in alignment with each other to maintain the first and second ring means in a generally fixed form;

b) connecting means for connecting the first and second ring means together axially spaced apart so that the ring means are spaced apart sufficiently to permit joining of the end portions of the conduits between the first and second ring means;

c) locking means for locking the first and second ring means in a fixed form said locking means including a U-shaped locking member having first and second side portions connected together by a cross member, the first and second side portions being separately pivotally connected to respective first end portions of the respective first arcuate members such that the cross member is immediately adjacent one of said connecting means so that neither the pivotal connection nor the cross member obstruct the weld area; and d) aligning means for axially aligning the end portions of the first and second conduits, the aligning means being disposed entirely between the ring means so as not to obstruct areas outside the first and second ring means, the aligning means including a plurality of adjustable contact surfaces for contacting respective end portions of the first and second conduits only in the space between the first and second ring means, each contact surface being movable relative to each other to move the first and second conduits into an axially aligned position.

12. An apparatus as claimed in claim 11 wherein the complementary mating end portions are received between the first and second side portions of the locking means such that spreading of the complementary mating end portions in an outward axial direction is prevented.

13. An apparatus as claimed in claim 11 wherein the locking means includes first and second inner side portions disposed parallel to and spaced apart from corresponding first and second side portions such that respective complementary mating end portions are received between respective side and inner side portions, respective side and inner side portions acting to prevent inward and outward axial spreading of respective complementary mating end portions.

14. A method of aligning conduits including pipes, pipe fittings, and the like prior to joining, the method comprising the steps of:

a) removably encircling an end portion of a first conduit with a first pair of arcuate members connected together to form a first fixed ring member;

b) removably encircling an end portion of a second conduit with a second pair of arcuate members connected together to form a second fixed ring member the first and second ring members being connected together in parallel spaced apart relation by a plurality of circumferentially spaced connecting means sufficiently spaced apart to provide unobstructed open spaces situated between the first and second fixed ring members and between said circumferentially spaced apart connecting means to permit welding of the conduits in said open spaces;

c) locking the first and second ring members in a fixed form, about the end portions of the conduits to be joined, while maintaining the open spaces unobstructed;

d) moving a plurality of adjustable contact surfaces disposed on the connecting means, relative to each other, the contact surfaces contacting the first and second conduits immediately adjacent the weld area to move the first and second conduits into an axially aligned position.

15. A method as claimed in claim 14 wherein the step of encircling includes the step of registering complementary engageable end portions of the arcuate members in alignment to maintain respective ring means in a generally circular form.

16. A method as claimed in claim 14 wherein the step of moving includes the step of extending first and second screws radially inward of the ring means such that first and second contact surfaces on the first and second screws respectively abut the end portions of the first and second conduits respectively.

17. A method as claimed in claim 14 further including the step of removably connecting an aligning member to at least one of the ring means.

18. A method as claimed in claim 14 further including the step of removably connecting a plurality of aligning members to one of the ring means.

* * * * *